United States Patent
Wang et al.

(10) Patent No.: US 12,518,387 B2
(45) Date of Patent: Jan. 6, 2026

(54) METHOD FOR NARROW-BAND IMAGE GENERATION

(71) Applicant: NATIONAL CHUNG CHENG UNIVERSITY, Chiayi County (TW)

(72) Inventors: Hsiang-Chen Wang, Chiayi (TW); Yu-Ming Tsao, Chiayi County (TW); Xian-Hong Shi, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 299 days.

(21) Appl. No.: 18/350,162

(22) Filed: Jul. 11, 2023

(65) Prior Publication Data

US 2024/0404060 A1    Dec. 5, 2024

(30) Foreign Application Priority Data

May 29, 2023  (TW) ................... 112119942

(51) Int. Cl.
*G06K 9/00*     (2022.01)
*A61B 1/06*     (2006.01)
(Continued)

(52) U.S. Cl.
CPC ............ *G06T 7/0014* (2013.01); *A61B 1/063* (2013.01); *G06V 10/761* (2022.01);
(Continued)

(58) Field of Classification Search
CPC ......... G06T 7/0014; G06T 2207/10024; G06T 2207/10068; G06T 2207/20084;
(Continued)

(56) References Cited

U.S. PATENT DOCUMENTS

| 2020/0410639 A1 | 12/2020 | Aoyama |
| 2021/0006757 A1 | 1/2021 | Aoyama |

FOREIGN PATENT DOCUMENTS

| CN | 114283056 A | * | 4/2022 | ............ G06N 3/045 |
| TW | 201941217 A | | 10/2019 | |

(Continued)

OTHER PUBLICATIONS

First Office Action mailed to Corresponding Taiwanese Patent Application No. 112119942 on Jan. 2, 2024.

(Continued)

*Primary Examiner* — Xin Jia
(74) *Attorney, Agent, or Firm* — Rosenberg, Klein & Lee

(57) ABSTRACT

A method for narrow-band image generation is provided. First obtaining an input image of an object by an image capture unit. Then converting the input image according to an image conversion model and at least one target wave band corresponding to a narrow-band light source to get a simulated narrow-band image. Lastly comparing a simulated narrow-band image information of the simulated narrow-band image with a reference narrow-band image information according to at least one objective similarity index to generate an index data for determining similarity between the simulated narrow-band image information and the reference narrow-band image information. Thereby the simulated narrow-band image is checked by the objective similarity index combined with simulation of narrow-band images using hyperspectral techniques to help doctors in interpretation of endoscopic images.

15 Claims, 9 Drawing Sheets

(51) Int. Cl.
*G06T 7/00* (2017.01)
*G06V 10/74* (2022.01)

(52) U.S. Cl.
CPC ............... *G06T 2207/10024* (2013.01); *G06T 2207/10068* (2013.01); *G06T 2207/20084* (2013.01); *G06T 2207/30096* (2013.01)

(58) Field of Classification Search
CPC . G06T 2207/30096; G06T 2207/20081; G06T 2207/30092; G06T 7/0012; A61B 1/063; A61B 1/000094; A61B 1/0638; G06V 10/761
See application file for complete search history.

(56) References Cited

FOREIGN PATENT DOCUMENTS

| TW | 1762388 B | * | 4/2022 | ........... G06T 7/0014 |
| TW | 1796156 B | * | 3/2023 | ........... A61B 1/0638 |
| WO | 2008019160 A2 | | 2/2008 | |

OTHER PUBLICATIONS

Search Report mailed to Corresponding Taiwanese Patent Application No. 112119942 on Jan. 2, 2024.

* cited by examiner

METHOD FOR NARROW-BAND IMAGE GENERATION

FIELD OF THE INVENTION

The present invention relates to a method for image generation, especially to a method for narrow-band image generation.

BACKGROUND OF THE INVENTION

The esophagus is a tubular organ which connects the pharynx to the stomach for sending food ingested through the mouth to the stomach. The normal esophageal mucosa includes multiple layers of squamous epithelial cells with thickness of 200-500 μm. The multiple layers consist of epithelium (EP), lamina propria mucosae (LPM), muscularis mucosae (MM), submucosa (SM), and muscularis propria (MP) from top to bottom. Esophageal cancer is the eighth most common cancer worldwide. Carcinoma is a malignancy that develops from epithelial cells. Cancer, also called malignant tumor, has certain impact on physiological functions and further includes sarcoma, lymphoma, leukemia, melanoma, carcinosarcoma, malignant glioma, etc.

Sarcoma is a type of cancer that arises in body's connective tissues, which include fibrous tissue, fat, muscle, blood vessels, bones, and cartilage. Lymphoma and leukemia are hematologic malignancies while melanoma develops in skin cells. Carcinosarcomas are malignant tumors that consist of a mixture of epithelial cancer and connective tissue cancer. As to malignant glioma, it is a type of nerve tissue cancer. In esophageal cancer, malignant cells not only infiltrate in epithelial tissue of esophagus but also in connective tissue at advanced stage.

Most of medical techniques for disease diagnosis available now depend on a single type of indicator or a piece of information such as temperature, blood pressure, and body scan images. For example, in order to detect serious diseases such as cancer, the most common medical device used now is image-based equipment including X-ray, computer tomography (CT) scan, nuclear magnetic resonance (NMR) imaging, etc. Various combinations of these techniques are useful in disease diagnosis in some degrees. Yet early detection of the serious diseases by the respective techniques is not so accurate, reliable, effective and economical while being used alone. Moreover, most of the devices are invasive and having larger volume such as those using X-ray, CT, and NMR. Thus more compact and accurate devices such as endoscope have been developed and used to observe lesions on different systems such as gastrointestinal system.

Furthermore, detection of esophageal cancer at early stage is not easy. Besides nearly no symptoms, a part of people with subtle changes such as a bit change in colors of the tissue are unable to be identified even using endoscopic examination. Thus a certain number of early-stage lesions of esophageal cancer are not diagnosed and thus the treatment is delayed.

The endoscopic imaging available now is divided into two categories.

White light imaging (WLI): by white light produced by red, green, and blue light being emitted into the esophagus and reflection spectra of three light sources are reconstructed in the computer to form images inside the esophagus. Yet diagnosis of early-stage lesions of esophageal cancer still depends on physician's experience.

As to narrow band imaging (NBI), the system is switched between white-light images and narrow-band images by a NBI filter, a RGB rotating filter, and a Xenon lamp. Wavelengths used by the NBI filter include 415 nm, 540 nm, and 600 nm able to enhance images of capillaries and cells in the body. However, the endoscope needs a larger volume for arrangement of optical filters so that it easily causes discomfort to patients.

The endoscopy is used to observe organs in the body with fewest side effects and the endoscopes used now are divided into the following two types.

A conventional endoscope introduced into human body through tracts or ducts typically includes a light source with optical fibers for sending light into the body, and an image capture device for sending image data captured out. In order to capture narrow-band images, optical fibers are arranged at the image capture device of the conventional endoscope. Thus the whole volume of the endoscope is increased and this lead to patient's discomfort.

A capsule endoscope introduced into human body without passing through tracts or ducts includes a 1.5 cm×2.5 cm capsule in which an image capture device, a light source, and a transmitter of the white-light microscope and a battery are mounted. The capsule endoscope swallowed by patients passes through a digestive system in the body and emits light periodically for taking pictures. Owing to compact volume, the capsule endoscope is unable to be provided with the optical filter. Thus only white-light images are transmitted to a receiver and early stage lesions are difficult to be recognized.

In order to solve the above problems, a method for narrow-band image generation according to the present invention is provided. The method is run by a host. An input image is converted into a simulated narrow-band image according to an image conversion model and a target wave band of a narrow-band light source. Last a simulated narrow-band image information and a reference narrow-band image information are compared according to an objective similarity index to generate an index data for determining similarity between the simulated narrow-band image and a reference narrow-band image. The problems of difficulty in identification of early lesions by white-light images captured by the white-light endoscope and larger volume required for mounting optical filters can be solved and the method helps physicians in interpretation of endoscopic images.

SUMMARY

Therefore, it is a primary object of the present invention to provide a method for narrow-band image generation to solve the problems of difficulty in recognition of early-stage lesions on white-light images captured by white-light endoscope and larger volume required for mounting optical filters in the narrow-band endoscope.

In order to achieve the above objects, a method for narrow-band image generation according to the present invention includes a plurality of steps run by a host. First obtaining an input image of an object by an image capture unit. Then converting the input image according to an image conversion model and at least one target wave band corresponding to a narrow-band light source to get a simulated narrow-band image. A simulated narrow-band image information of the simulated narrow-band image and a reference narrow-band image information are compared according to an objective similarity index to generate an index data used for checking the simulated narrow-band image.

Preferably, the image capture unit is a white-light endoscope.

Preferably, in the step of converting the input image according to an image conversion model and at least one target wave band corresponding to a narrow-band light source to get a simulated narrow-band image, obtaining the image conversion model in advance further includes the following steps. First getting an input white-light spectrum and a white-light reflection spectrum according to a white light source. Then obtaining an input narrow-band spectrum and a narrow-band reflection spectrum according to a narrow-band light source and getting a reflection spectrum space value from the white-light reflection spectrum and the narrow-band reflection spectrum according to a transformation function of reflection spectrum space. Next getting a light-source space value from the white-light spectrum and the narrow-band spectrum according to a spectral space transformation function and obtaining a correction matrix according to the reflection spectrum space value and the light-source space value. Then obtaining a correction space value from the reflection spectrum space value according to the correction matrix. Lastly getting the image conversion model according to the correction space value, the white-light reflection spectrum, and the narrow-band reflection spectrum.

Preferably, the white light source is a white-light source for endoscopes.

Preferably, the white-light reflection spectrum is obtained by the white-light source for endoscopes to capture single-color sRGB images (24-color ColorChecker) and 24-color reflection spectrum data.

Preferably, the narrow-band light source is a narrow-band light source for endoscopes.

Preferably, the narrow-band reflection spectrum is obtained by the narrow-band light source for endoscopes to capture single-color sRGB images (X-Rite ColorChecker Classic, 24 colors) and 24-color reflection spectrum data.

Preferably, 415 nm blue light which is absorbed largely by hemoglobin, 540 nm green light for easy recognition of esophageal lesions, and red light at 600 nm band able to detect blood vessels in the deepest layer are used for detection of esophageal cancer at the wave band.

Preferably, the objective similarity index IND used is a CIEDE2000 color-difference formula, an image entropy, or a structural similarity (SSIM) index.

Preferably, the CIEDE2000 is a color-difference formula for calculating perceived color difference between the simulated narrow-band image information and the reference narrow-band image information based on a uniform color space.

Preferably, the image entropy uses comparison of chaos in images to evaluate advantages of the simulated narrow-band image information and the reference narrow-band image information in image recognition.

Preferably, the SSIM index uses weighted calculation of three elements including luminance, contrast, and structure to evaluate advantages of the simulated narrow-band image information and the reference narrow-band image information in image recognition.

Preferably, in order to obtain the reference narrow-band image information before the step of comparing a simulated narrow-band image information with a reference narrow-band image information according to an objective similarity index to generate an index data used for checking the simulated narrow-band image, the method further includes a step of obtaining the reference narrow-band image information of a plurality of reference narrow-band images according to the plurality of the reference narrow-band images.

Preferably, the plurality of the reference narrow-band images is a plurality of narrow-band endoscopic images.

Preferably, the image conversion model is a CycleGAN model.

Preferably, the image capture unit is a white-light endoscope.

Preferably, the objective similarity index IND used is a CIEDE2000 color-difference formula, an image entropy, or a structural similarity (SSIM) index.

Preferably, the CIEDE2000 is a color-difference formula for calculating perceived color difference between the simulated narrow-band image information and the reference narrow-band image information based on a uniform color space.

Preferably, the image entropy uses comparison of chaos in images to evaluate advantages of the simulated narrow-band image information and the reference narrow-band image information in image recognition.

Preferably, the SSIM index uses weighted calculation of three elements including luminance, contrast, and structure to evaluate advantages of the simulated narrow-band image information and the reference narrow-band image information in image recognition.

Preferably, Preferably, in order to obtain the reference narrow-band image information before the step of comparing a simulated narrow-band image information with a reference narrow-band image information according to an objective similarity index to generate an index data used for checking the simulated narrow-band image, the method further includes a step of obtaining the reference narrow-band image information of a plurality of reference narrow-band images according to the plurality of the reference narrow-band images.

Preferably, the plurality of the reference narrow-band images is a plurality of narrow-band endoscopic images.

In summary, the present invention provides a method for narrow-band image generation. First input images are converted by the image conversion model. The input images captured by the image capture unit are converted into the narrow-band images after simulation and the index data is generated by comparing the simulated narrow-band image information of the simulated narrow-band image with the reference narrow-band image information according to the objective similarity index. Thereby the white-light images captured by the white-light endoscope are converted into the narrow-band images which help physicians to interpret the images and find out the early-stage lesions easier. No optical filter is required to get the narrow-band images so that discomfort caused by increased volume of the endoscope with the optical filter can be avoided.

DETAILED DESCRIPTION OF THE INVENTION

In order to learn features and functions of the present invention more clearly, please refer to the following embodiments with detailed description.

The early-stage lesions are difficult to be recognized by white-light images captured by the conventional white-light endoscope. As to the narrow-band images, a larger volume required for mounting optical filters in the narrow-band endoscope further causes patient's discomfort. Thereby the present invention provides a method for narrow-band image generation which solves the problems mentioned above.

Features of a narrow-band image generation method and a system used in combination with the method according to the present invention are described below.

Figure 1A:
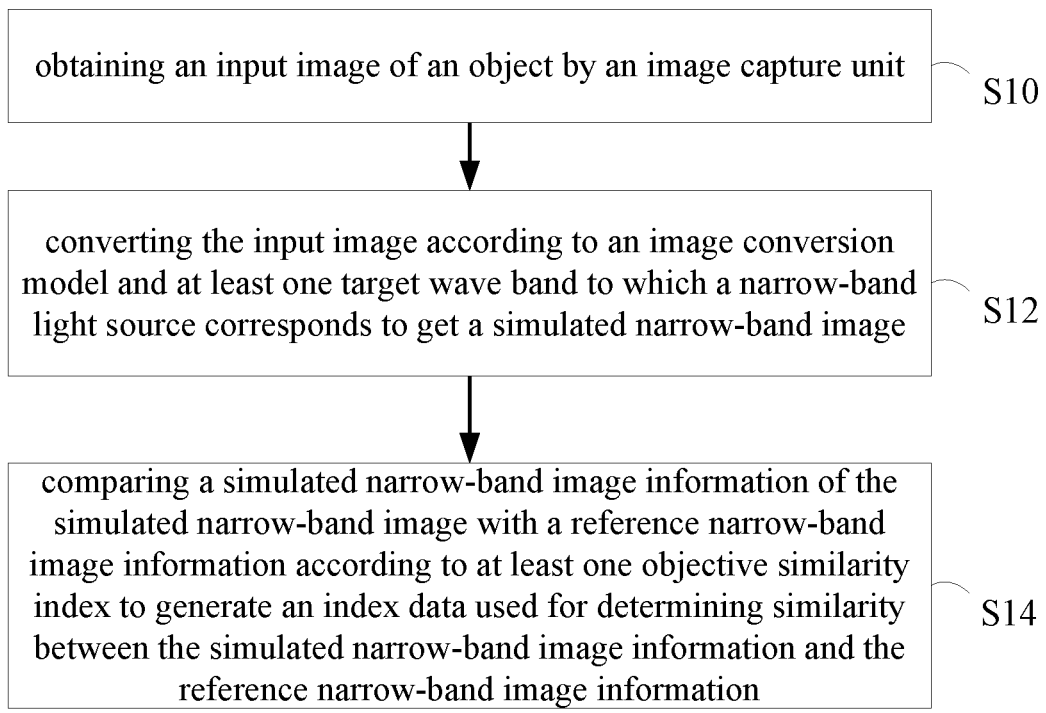
FIG. 1A is a flow chart showing steps of an embodiment of a method for narrow-band image generation according to the present invention.

Please refer to FIG. 1A, a flow chart showing steps of a narrow-band image generation method in a first embodiment of the present invention is provided. As shown in figure, the present narrow-band image generation method which includes the following steps is executed by a main machine 10.

Step S10: obtaining an input image IMG of an object O by an image capture unit 20;

Step S12: converting the input image IMG according to an image conversion model MODEL and at least one target wave band BAND corresponding to a narrow-band light source to get a simulated narrow-band image SIMG; and Step S14: comparing a simulated narrow-band image information SD of the simulated narrow-band image SIMG with a reference narrow-band image information REF according to at least one objective similarity index IND to generate an index data RESULT used for determining similarity between the simulated narrow-band image information SD and the reference narrow-band image information REF.

Figure 1B:
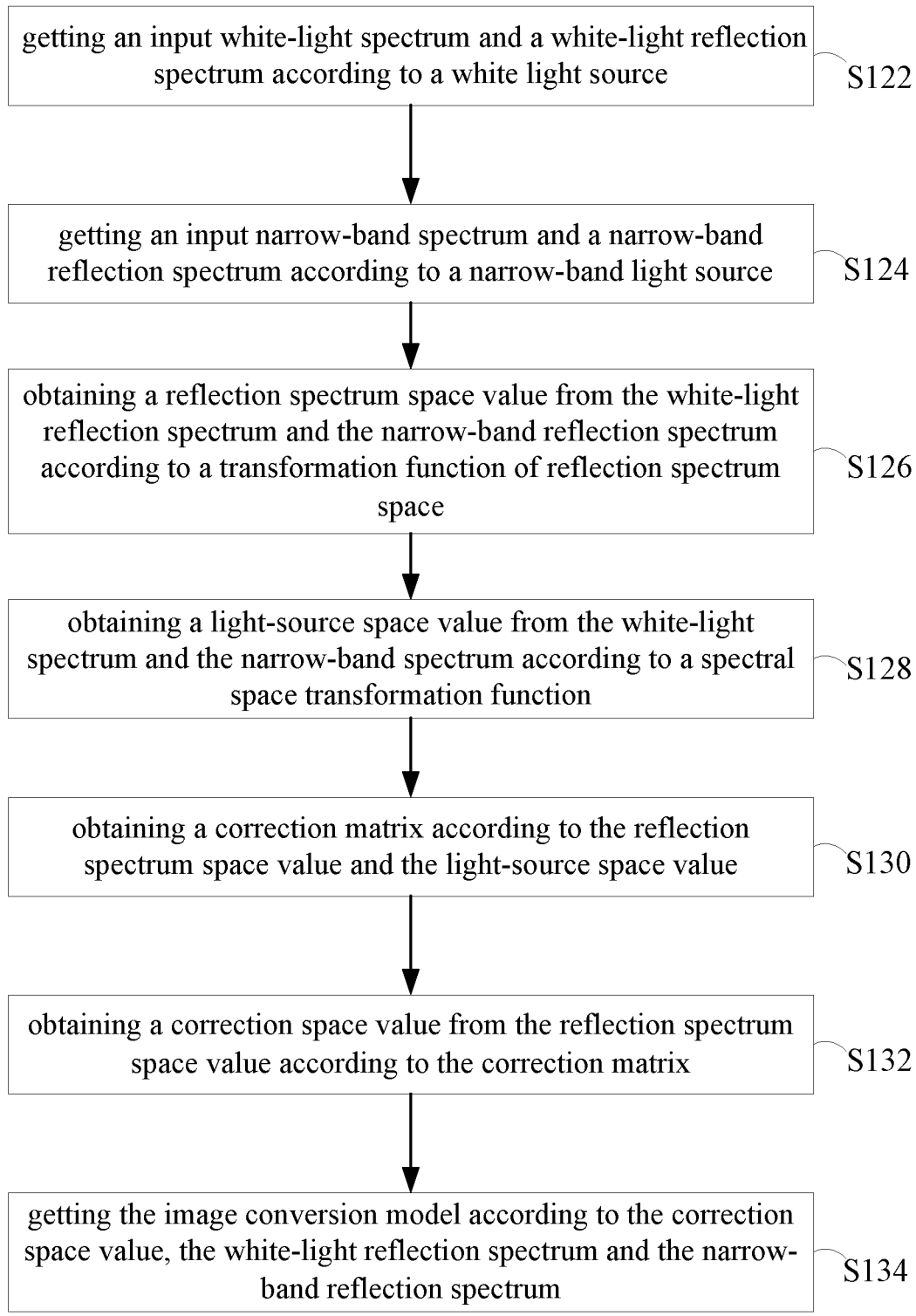
FIG. 1B is a flow chart showing steps of obtaining an image conversion model of the first embodiment according to the present invention.

Refer to FIG. 1B, a flow chart showing steps of obtaining the image conversion model MODEL of the first embodiment according to the present invention is provided. The step S12 further consists of the following steps.

Figure 1C:
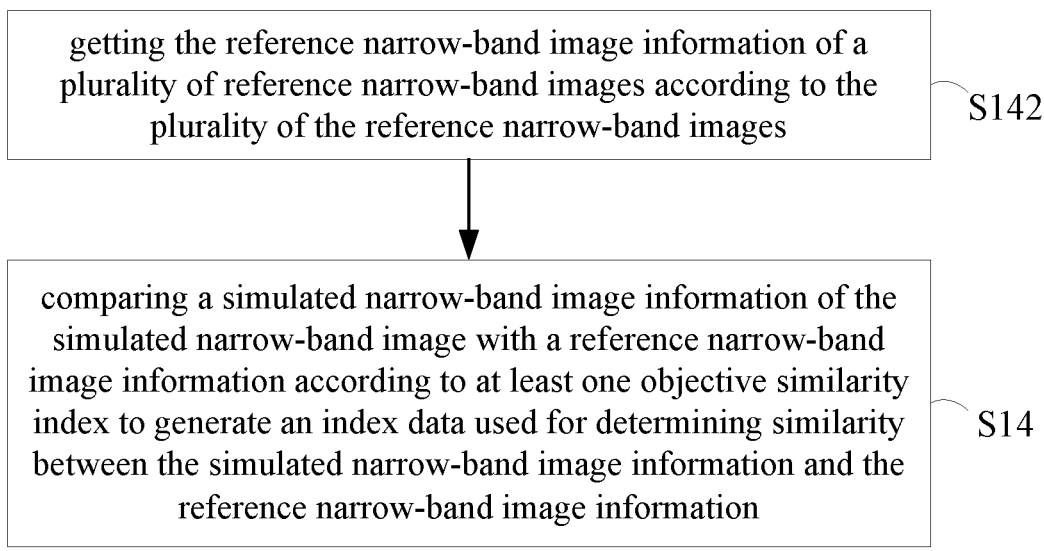
FIG. 1C is a flow chart showing steps of obtaining reference narrow-band image information in an embodiment according to the present invention.

Step S122: getting an input white-light spectrum and a white-light reflection spectrum according to a white light source;

Step S124: getting an input narrow-band spectrum and a narrow-band reflection spectrum according to a narrow-band light source;

Step S126: obtaining a reflection spectrum space value from the white-light reflection spectrum and the narrow-band reflection spectrum according to a transformation function of reflection spectrum space;

Step S128: obtaining a light-source space value from the white-light spectrum and the narrow-band spectrum according to a spectral space transformation function;

Step S130: obtaining a correction matrix C according to the reflection spectrum space value and the light-source space value;

Step S132: obtaining a correction space value from the reflection spectrum space value according to the correction matrix C;

Step S134: getting the image conversion model MODEL according to the correction space value, the white-light reflection spectrum and the narrow-band reflection spectrum;

Refer to FIG. 1C, a flow chart showing steps of obtaining the reference narrow-band image information REF in the first embodiment is provided. The present method further includes the following step before the step S14.

Step S142: getting the reference narrow-band image information REF of a plurality of reference narrow-band images according to the plurality of the reference narrow-band images.

Figure 2A:
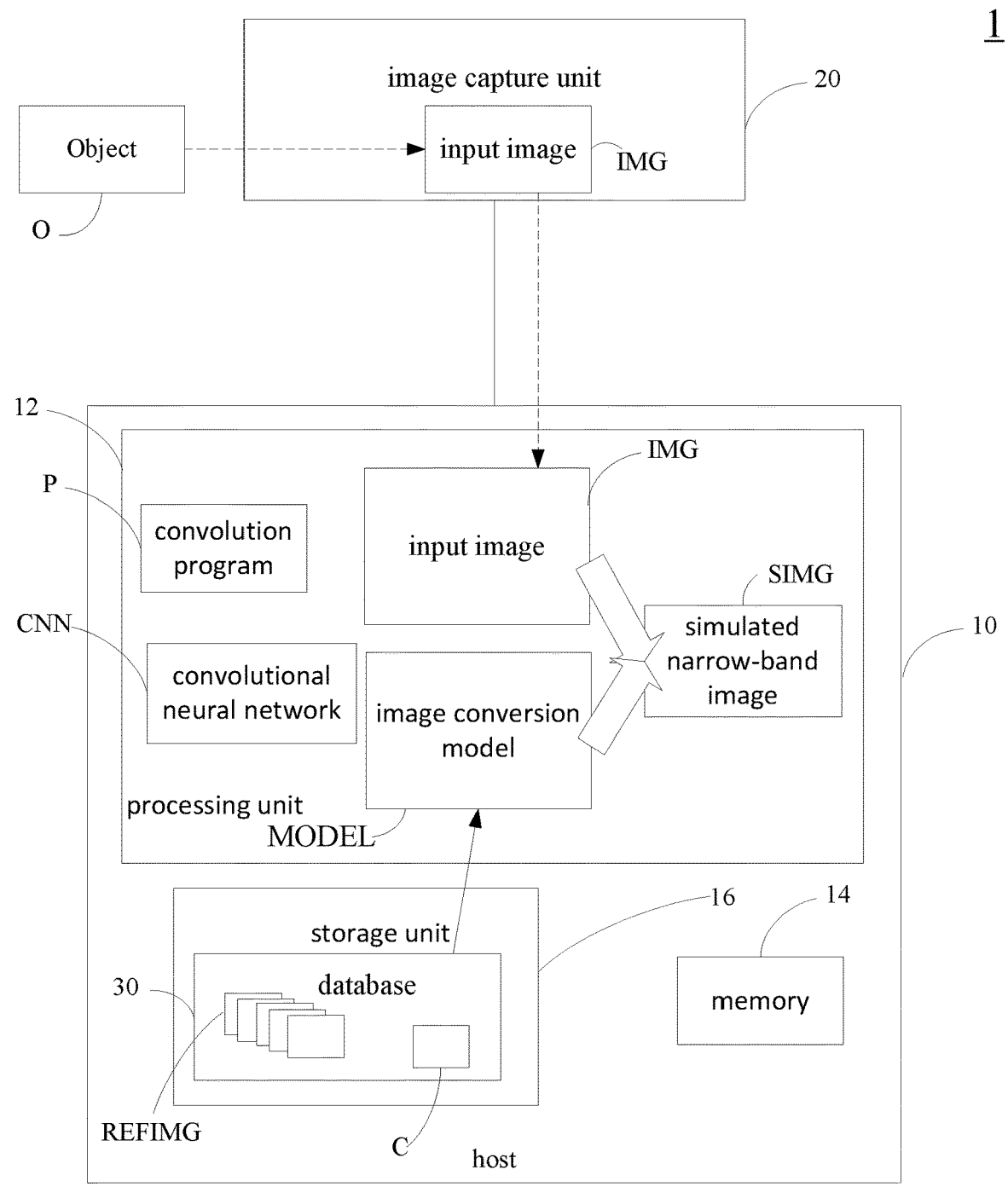
FIG. 2A-2B are block diagrams showing a part of steps of the first embodiment according to the present invention.
Figure 2B:
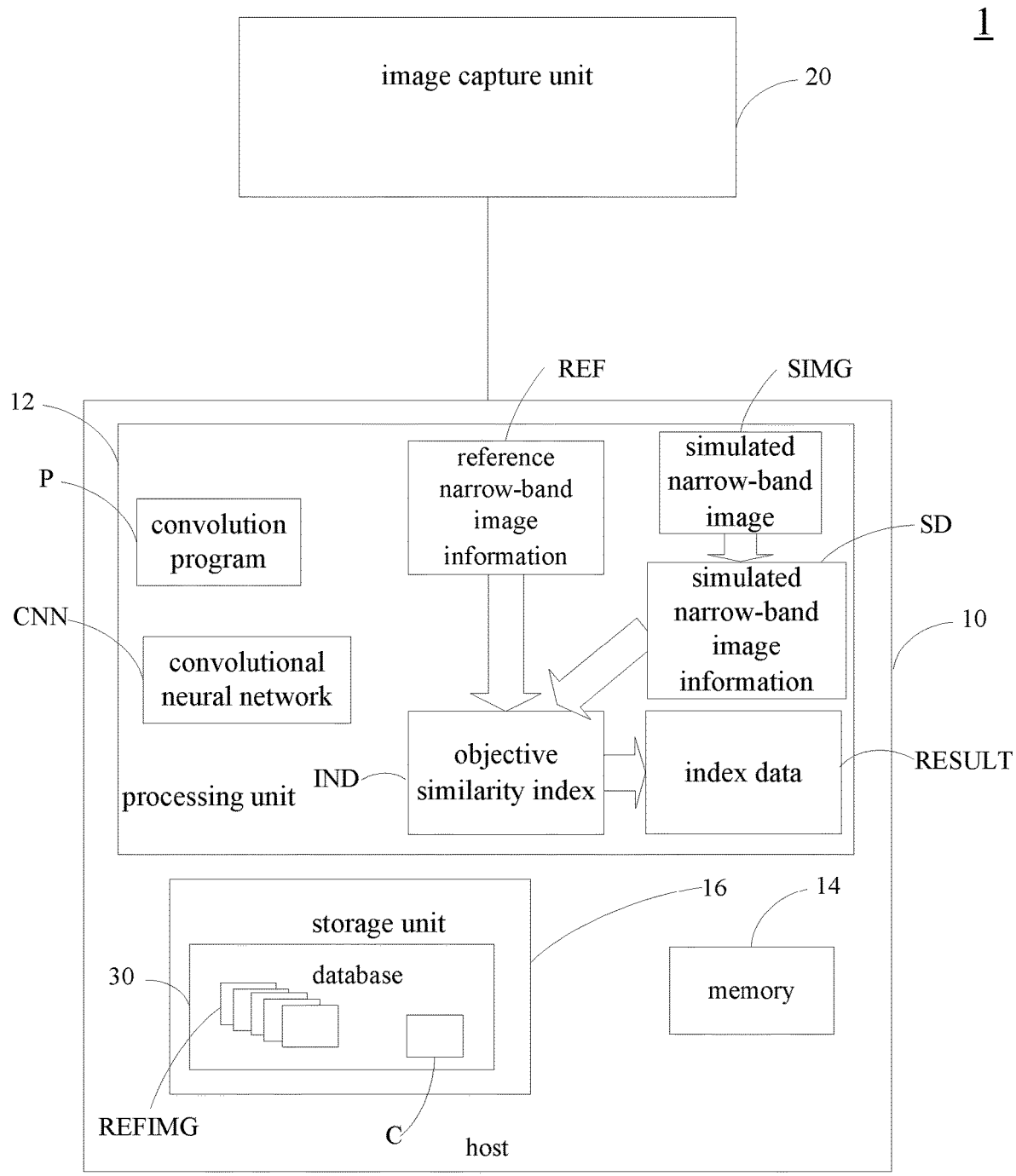

Refer to FIG. 2A and FIG. 2B, a block diagram showing a part of steps of the present method is provided. As shown in figures, the present narrow-band image generation method for checking objects is used in combination with a detection system 1 which includes a host 10 and an image capture unit 20. In this embodiment, the host 10 is, but not limited to, a computer composed of a processing unit 12, a memory 14 and a storage unit 16. The host 10 can also be servers, desktops, tablets, or electronic devices with computing capabilities. A database 30 is built in the storage unit 16 or an external storage device of the host 10. In the host 10, a convolution program P is run by the processing unit 12 and a convolutional neural network (CNN) 126 is set up correspondingly. Moreover, the image capture unit 20 in this embodiment is an endoscope used to look deep into organs and tissues inside the body including cystoscope, gastroscope, colonoscope, bronchoscope, laparoscope, etc.

First run the step S10, refer to FIG. 2A which is a block diagram showing a part of steps of the present method. An input image IMG of an object O is obtained by the image capture unit 20 in the first embodiment. The image capture unit 20 is used to capture images and perform preprocessing for removal of noises and resize the images into a size of 380×380 pixels uniformly. Thus the input image IMG which is a white-light endoscopic image is obtained. The image capture unit 20 of the first embodiment is a white light endoscope (OLYMPUS EVIS LUCERA CV-260 SL) which gets the corresponding input image IMG.

Refer to FIG. 2A which is a block diagram showing a part of steps of the present method, the host 10 executes the step S12. In the first embodiment, the input image IMG is converted into a simulated narrow-band image SIMG according to an image conversion model MODEL and at least one target band BAND to which a narrow-band light source corresponds. According to equation 1 to equation 6 of the image conversion model MODEL pre-stored in the database 30, the input image IMG is converted into a hyperspectral input image HSIMG. Then performing dimension reduction on the hyperspectral input image HSIMG according to equation 7 to equation 11 of the image conversion model MODEL pre-stored in the database 30 and at least one target band BAND to which the narrow-band light source corresponds to get the simulated narrow-band image SIMG. The equations are given below:

$$\begin{bmatrix} X \\ Y \\ Z \end{bmatrix} = [M_A][T]\begin{bmatrix} f(R_{SRGB}) \\ f(G_{SRGB}) \\ f(B_{SRGB}) \end{bmatrix} \times 100, 0 \le \begin{matrix} B_{SRGB} \\ R_{SRGB} \\ G_{SRGB} \end{matrix} \le 1 \quad \text{equation 1}$$

$$V_{Color} = [XYZ\ XY\ YZ\ XZ\ X\ Y\ Z]^T \quad \text{equation 2}$$

$$[S_{Spectrum}]_{380-780} = [EV][M][V_{Color}] \quad \text{equation 3}$$

wherein

-continued $$[T] = \begin{bmatrix} 0.4104 & 0.3576 & 0.1805 \\ 0.2126 & 0.7152 & 0.0722 \\ 0.0193 & 0.1192 & 0.9505 \end{bmatrix} \quad \text{equation 4}$$

$$f(n) = \begin{cases} \left(\dfrac{n+0.055}{1.055}\right), & n > 0.04045 \\ \left(\dfrac{n}{12.92}\right), & \text{otherwise} \end{cases} \quad \text{equation 5}$$

$$[M_A] = \begin{bmatrix} X_{SW}/X_{CW} & 0 & 0 \\ 0 & Y_{SW}/X_{CW} & 0 \\ 0 & 0 & Z_{SW}/Z_{CW} \end{bmatrix} \quad \text{equation 6}$$

f(n) is gamma function, T is conversion matrix, $[M_A]$ is chromatic adaptation transform matrix.

Use the convolutional neural network (CNN) 126 to convert sRBG value of the input image IMG into XYZ color space through the equation 1. Then XYZ color space value obtained is substituted into a correction variable matrix of the equation 2. Lastly [EV] and [M] obtained by principal component analysis (PCA) of the convolutional neural network 126 together with the equations 1 and 2 are substituted into the equation 3 to get $[S_{Spectrum}]_{380\text{-}780}$ which is the hyperspectral input image HSIMG in the visible light band. The convolutional neural network 126 also performs dimension reduction on the hyperspectral input image HSIMG by using the equation 7 to equation 11 of the image conversion model MODEL.

In order to get simulated narrow-band images, bands used by narrow-band light sources for endoscopes including 415 nm, 540 nm, and 600 nm are the target bands BAND. The longer the wavelength, the deeper the penetration. The light with different colors (wavelengths) has different effects on band selection of narrow-band imaging. In visible spectrum, red light has the longest wavelength, green light has shorter wavelength, and blue light has the shortest wavelength. 415 nm narrow band light which is absorbed largely by hemoglobin is used for detection of blood vessels. The blue light (415 nm) has shallow penetration depth so that capillaries in superficial mucosa are brown. As to 540 nm narrow band light, it is for superficial mucosa lesion discrimination and blood vessels in submucosa tissues are cyan. The red light at 600 nm band with deeper penetration ability can detect blood vessels in the deepest layer. The use of the above three bands can identify different layers of the mucosa for better detection of mucosal lesions.

Once the target band BAND is selected, convert the visible spectrum from 380-780 nm to which the hyperspectral input image HSIMG corresponds into XYZ color space through the following equations 7-11. The XYZ color space value at the corresponding target band BAND obtained from the hyperspectral input image HSIMG is converted into RGB value by the following equation 11 to generate the simulated narrow-band image SIMG corresponding to the target band BAND.

$$X = k \int_{380nm}^{780nm} S(\lambda)R(\lambda)\bar{x}(\lambda)d\lambda \quad \text{equation 7}$$

$$Y = k \int_{380nm}^{780nm} S(\lambda)R(\lambda)\bar{y}(\lambda)d\lambda \quad \text{equation 8}$$

$$Z = k \int_{380nm}^{780nm} S(\lambda)R(\lambda)\bar{z}(\lambda)d\lambda \quad \text{equation 9}$$

wherein k is shown in the following equation 10:

$$k = 100 \int_{380nm}^{780nm} S(\lambda)\bar{y}(\lambda)d\lambda \quad \text{equation 10}$$

$$\begin{bmatrix} R \\ G \\ B \end{bmatrix} = \begin{bmatrix} 3.240479 & -1.53715 & -0.498535 \\ -0.969256 & 1.875991 & 0.041556 \\ 0.055648 & -0.204043 & 1.057311 \end{bmatrix} \begin{bmatrix} X \\ Y \\ Z \end{bmatrix} \quad \text{equation 11}$$

Refer to FIG. 2B which is a block diagram showing a part of steps of the present method, the host 10 runs the step S14. In the first embodiment, comparing a simulated narrow-band image information SD of the simulated narrow-band image SIMG with a reference narrow-band image information REF according to an objective similarity index IND to generate an index data RESULT which is used for determining similarity between the simulated narrow-band image information SD and the reference narrow-band image information REF. First sRGB value of the simulated narrow-band image SIMG is converted into XYZ color space to get a XYZ color space value of the simulated narrow-band image SIMG which is the simulated narrow-band image information SD. Then compare similarity between the simulated narrow-band image information SD and the at least one reference narrow-band image information REF pre-stored in the database 30 according to the at least one objective similarity index IND pre-stored in the database 30 to generate an index data RESULT for determining the similarity between the simulated narrow-band image information SD and the reference narrow-band image information REF.

In the first embodiment, the objective similarity index IND used is a CIEDE2000 color-difference formula, an image entropy, or a structural similarity (SSIM) index.

CIEDE2000 is a color-difference formula recommended by the CIE (International Commission on Illumination) to predict visually perceived color difference. Based on a three-dimensional concept of a uniform color space, this formula calculates the color difference perceived by human, as the distance between two color points within a color space.

Lab value of Lab color space is used in the CIEDE2000 color-difference formula. Thus the RGB value of the simulated narrow-band image SIMG is converted to the XYZ color space by the equation 12 and then further converted to the Lab color space by the equation 11 to get the Lab value and obtain color difference between the simulated narrow-band image information SD and the reference narrow-band image information REF, as shown in the following table 1 and used as the index data RESULT.

$$\begin{bmatrix} X \\ Y \\ Z \end{bmatrix} = \begin{bmatrix} 0.4124564 & 0.3575761 & 0.1804375 \\ 0.2126729 & 0.7151522 & 0.0721750 \\ 0.0193339 & 0.1191920 & 0.9503041 \end{bmatrix} \begin{bmatrix} R \\ G \\ B \end{bmatrix} \quad \text{equation 12}$$

TABLE 1

CIEDE2000 color difference evaluation of simulated narrow-band images in the first embodiment:

| Image | CIEDE2000 Min | CIEDE2000 Average | CIEDE2000 Max |
|---|---|---|---|
| white-light image | 2.07 | 8.24 | 14.91 |
| narrow-band image | 5.85 | 12.29 | 20.71 |

TABLE 1-continued

CIEDE2000 color difference evaluation of simulated
narrow-band images in the first embodiment:

| Image | CIEDE2000 Min | CIEDE2000 Average | CIEDE2000 Max |
|---|---|---|---|
| simulated narrow-band image in the first embodiment | 6.43 | 13.61 | 21.06 |

According to the color difference evaluation shown in table 1, it is learned that the color difference between white-light image and background is smaller compared with other images while the simulated narrow-band image in the first embodiment is highly similar to the narrow-band image in the color difference.

Entropy is first applied to thermodynamics and associated with the amount of chaos in a system, representing unavailability of the system's thermal energy for conversion into mechanical work. The greater the mass, the larger the entropy. While being used in the image, the image entropy represents how "busy" the image is. The greater the entropy of the image, the more information the image contains. Moreover, the entropy of the image in focus is larger than that of the image not in focus. The larger the entropy, the clearer the image. Yet that also means the image having higher chaos and uncertainty.

Based on the entropy of the image and free change of gray-scale of respective pixels in the image, an 8-bit image has a value of grayscale ranging from 0 to 255 and there are 256 different levels. First get a grayscale histogram and then calculate probability of the respective levels. At last, the feature of the grayscale distribution is obtained by calculation of entropy using equation 13 and entropy values of the simulated narrow-band image information SD and the reference narrow-band image information REF are also obtained, as shown in the following table 2 and used as the index data RESULT.

$$H = -\sum_{i=0}^{255} \log_2 Pi \qquad \text{equation 13}$$

TABLE 2 comparison of entropy values of the simulated
narrow-band images in the first embodiment

| Image | Entropy Min | Entropy Average | Entropy Max |
|---|---|---|---|
| white-light image | 5.31 | 6.47 | 7.37 |
| narrow-band image | 5.11 | 6.15 | 7.19 |
| simulated narrow-band image in the first embodiment | 3.39 | 4.77 | 6.18 |

According to the entropy values of the images in Table 2, it is learned that the simulated narrow-band images in the first embodiment have lower chaos, less uncertainty, and difficulty in observation by eyes, but more advantages in AI assisted recognition compared with other images.

The SSIM is an index used for measuring the similarity between two images with the same size or detecting distortion of the images. The images are evaluated by comparison of luminance, contrast, and structure of the two images.

Calculation of the SSIM: first evaluate the luminance, the contrast, and the structure. In the luminance, perform average measurement using equation 14 through all image pixel values. xi is the pixel value of the i-th pixel of an image x while N is total number of the pixel values. As to the contrast, use equation 15 to take standard deviation (square root of the variance) of all pixel values for measurement. With respect to the structure, perform normalization of signals according to their own standard deviation so that the two signals being compared have unit standard deviation for measurement of structure, as shown in equation 16.

$$\mu_x = \frac{1}{N} \sum_{i=1}^{N} x_i \qquad \text{equation 14}$$

$$\sigma_x = \left( \frac{1}{N-1} \sum_{i=1}^{N} (x_i - \mu_x)^2 \right)^{\frac{1}{2}} \qquad \text{equation 15}$$

$$\sigma_{xy} = \frac{1}{N-1} \sum_{i=1}^{N} (x_i - \mu_x)(y_i - \mu_y) \qquad \text{equation 16}$$

Lastly, perform weighted calculation of the three elements—the luminance, the contrast, and the structure by equation 17 to get the SSIM index of the simulated narrow-band image information SD and the reference narrow-band image information REF shown in the following table 3, used as the index data RESULT.

$$SSIM(x, y) = [l(x, y)]^\alpha \cdot [c(x, y)]^\beta \cdot [s(x, y)]^\gamma \qquad \text{equation 17}$$

TABLE 3 similarity comparison of SSIM of the simulated
narrow-band images in the first embodiment

| Image | SSIM Min | SSIM Average | SSIM Max |
|---|---|---|---|
| simulated narrow-band image & narrow-band image in the first embodiment | 0.61 | 0.68 | 0.8 |

According to the similarity comparison of SSIM in table 3, the simulated narrow-band images SIMG of the first embodiment and the narrow-band images are similar images after weighted calculation. Thereby the simulated narrow-band images SIMG can replace the narrow-band images for image recognition.

Refer to FIG. 1B, a flow chart showing steps to get the image conversion model MODEL in the first embodiment of the present invention is provided. The step S12 further includes the following steps.

The host executes the step S122, getting an input white-light spectrum and a white-light reflection spectrum according to a white light source. The white-light source is a white light endoscope (OLYMPUS EVIS LUCERA CV-260 SL) to capture single-color sRGB images (X-Rite ColorChecker Classic, 24 colors) and 24-color reflection spectrum data and get the white-light spectrum and the white-light reflection spectrum which are then stored in the database 30.

The host 10 runs the Step S124: getting an input narrow-band spectrum and a narrow-band reflection spectrum according to a narrow-band light source. The narrow-band light source is a narrow-band endoscope (OLYMPUS EVIS LUCERA CV-260 SL) to capture single-color sRGB images (X-Rite ColorChecker Classic, 24 colors) and 24-color reflection spectrum data and get the narrow-band spectrum and the narrow-band reflection spectrum which are then stored in the database 30.

The host 10 runs the Step S126, obtaining a reflection spectrum space value from the white-light reflection spectrum and the narrow-band reflection spectrum according to a transformation function of reflection spectrum space while the transformation function of reflection spectrum space is the same as the equation 1 and equations 4-6 mentioned above and shown below.

$$\begin{bmatrix} X \\ Y \\ Z \end{bmatrix} = [M_A][T] \begin{bmatrix} f(R_{SRGB}) \\ f(G_{SRGB}) \\ f(B_{SRGB}) \end{bmatrix} \times 100, 0 \le \begin{matrix} R_{SRGB} \\ G_{SRGB} \\ B_{SRGB} \end{matrix} \le 1 \quad \text{equation 1}$$

wherein $$[T] = \begin{bmatrix} 0.4104 & 0.3576 & 0.1805 \\ 0.2126 & 0.7152 & 0.0722 \\ 0.0193 & 0.1192 & 0.9505 \end{bmatrix} \quad \text{equation 4}$$

$$f(n) = \begin{cases} \left(\frac{n+0.055}{1.055}\right), & n > 0.04045 \\ \left(\frac{n}{12.92}\right), & \text{otherwise} \end{cases} \quad \text{equation 5}$$

$$[M_A] = \begin{bmatrix} X_{SW}/X_{CW} & 0 & 0 \\ 0 & Y_{SW}/X_{CW} & 0 \\ 0 & 0 & Z_{SW}/Z_{CW} \end{bmatrix} \quad \text{equation 6}$$

Equations for conversion of reflection spectrum data captured by a spectrometer into the XYZ color space are the same as the above equations 7-10 and shown below.

$$X = k \int_{380nm}^{780nm} S(\lambda)R(\lambda)\bar{x}(\lambda)d\lambda \quad \text{equation 7}$$

$$Y = k \int_{380nm}^{780nm} S(\lambda)R(\lambda)\bar{y}(\lambda)d\lambda \quad \text{equation 8}$$

$$Z = k \int_{380nm}^{780nm} S(\lambda)R(\lambda)\bar{z}(\lambda)d\lambda \quad \text{equation 9}$$

wherein k is obtained by the following equation 10;

$$k = 100 \int_{380nm}^{780nm} S(\lambda)\bar{y}(\lambda)d\lambda \quad \text{equation 10}$$

$\bar{x}(\lambda)$, $\bar{y}(\lambda)$, $\bar{z}(\lambda)$ are color matching functions; $S(\lambda)$ is a light source spectrum of the endoscope for shooting. In the XYZ color space, Y value is proportional to the brightness. Thus the maximum Y (maximum brightness) of the light source spectrum is obtained by the equation 10. Then a brightness ratio k is further obtained by specifying the upper limit of the Y value as 100. XYZ value $[XYZ_{Spectrum}]$ is further obtained by the equations 7-9. That's the reflection spectrum space value which is then stored in the database 30.

The step S128 is run by the host 10. A light-source space value is obtained from the white-light spectrum and the narrow-band spectrum according to a spectral space transformation function. The spectral space transformation function needs to convert the white-light spectrum, the narrow-band spectrum, and the spectrometer into the same XYZ color space. The spectral space transformation function performs calculation by the equation 1 and the equations 4-6.

The equation 1 shows conversion of sRGB color space to XYZ color space. Since data of the endoscopic images is stored in sRGB color space format. R, G, B values (0~255) of the endoscopic image should be converted into a small scale range (0~1). Then the sRGB value is converted into linear RGB value by equation 3. At last the linear RGB value is converted into XYZ value in the XYZ color space by calculation using equations 1-3. During the conversion process, chromatic adaptation transform matrix $[M_A]$ in equation 4 is used for correction. This is due to that white point in the sRGB color space is D65 (XCW, YCW, ZCW) which is different from white point of light source for measurement (XSW, YSW, ZSW). By the chromatic adaptation transform matrix $[M_A]$, $[XYZ_{Endoscope}]$ under the light source for measurement can be obtained. That's light-source space value which is then stored in the database 30.

The host 10 runs the step S130, obtaining a correction matrix C according to the reflection spectrum space value and the light-source space value. The correction matrix C uses the reflection spectrum space value $[XYZ_{Spectrum}]$ as the standard and expands the [X Y Z] T-matrix of the light-source space value $[XYZ_{Endoscope}]$ into a variable matrix V with a correction variable.

The variance matrix [V] is given by analysis of factors that cause errors in endoscope during shooting including nonlinear response and dark current of the endoscope, inaccurate color separation and color shift (such as white balance) of filters. The correction matrix C for correction of the endoscope is obtained by multiple regression analysis through the following equation 18.

$$[C] = [XYZ_{Spectrum}] \times pinv([V]) \quad \text{equation 18}$$

Correction of the non-linear response is carried out by using third-order equation because the narrow band images and white light images have similar values of third-order operational convolution matrix. The correction of the non-linear response uses the following equation 19.

$$V_{Non-linear} = \begin{bmatrix} X^3 Y^3 Z^3 X^2 Y^2 Z^2 X\ Y\ Z\ 1 \end{bmatrix}^T \quad \text{equation 19}$$

Generally, the dark current of the endoscope is a fixed value which is not changed significantly along with the changes in the amount of the light received. Thereby impact of the dark current is considered as a constant and a correction variance of the dark current is defined as $V_{Dark}$ which is corrected by the following equation 20.

$$V_{Dark} = [\alpha] \quad \text{equation 20}$$

A correction variance of the inaccurate color separation and color shift of filters is defined as $V_{color}$ while $\bar{x}(\lambda)$, $\bar{y}(\lambda)$, $\bar{z}(\lambda)$ are color matching functions for conversion of RGB color space to XYZ color space. According to correlation among $\bar{x}(\lambda)$, $\bar{y}(\lambda)$, $\bar{z}(\lambda)$, all possibilities among X, Y, and Z are listed in the form of combinations, as shown in the following equation 2 for correction of inaccurate color separation and color shift of the endoscopic images.

$$V_{Color} = [XYZ\ XY\ YZ\ XZ\ X\ Y\ Z]^T \quad \text{equation 2}$$

The variance matrix V shown in the equation 21 below is obtained from the above equations 19-20 and equation 2.

$$V = [X^3 Y^3 Z^3 \; X^2 Y \; X^2 Z \; Y^2 Z \; XZ^2 \; YZ^2 \; XYZ \; X^2 Y^2 Z^2 \; XY \; YZ \; XZ \; X \; Y \; Z \; \alpha]^T \quad \text{equation 21}$$

At last the correction matrix C for correction of the endoscope is obtained by the equation 18 and then stored in the database 30.

The host 10 runs the step S132: obtaining a correction space value from the reflection spectrum space value according to the correction matrix C. The corrected X, Y, Z values [XYZ$_{Correct}$] are obtained by the variance matrix V in the equation 21 in combination with the correction matrix C, as shown in the following equation 22. The [XYZ$_{Correct}$] is the correction space value.

$$[XYZ_{Correct}] = [C] \times [V] \quad \text{equation 22}$$

As to the white light images, the average error value of [XYZ$_{Correct}$] and [XYZ$_{Spectrum}$] is 1.40. The average error of [XYZ$_{Correct}$] and [XYZ$_{Spectrum}$] in the narrow band images is 2.39

The above calculation uses visible light band ranging from 380 nm to 780 nm. Thus correction result of the endoscope is represented by color difference wherein [XYZ$_{Correct}$] and [XYZ$_{Spectrum}$] are converted to Lab color space to which the CIE DE2000 color-difference formula corresponds. The following equations 23-25 are color space conversion functions.

$$L^* = 116 f\left(\frac{Y}{Y_n}\right) - 16 \quad \text{equation 23}$$

$$a^* = 500\left[f\left(\frac{X}{X_n}\right) - f\left(\frac{Y}{Y_n}\right)\right] \quad \text{equation 24}$$

$$b^* = 200\left[f\left(\frac{Y}{Y_n}\right) - f\left(\frac{Z}{Z_n}\right)\right] \quad \text{equation 25}$$

wherein f(n) is shown in the following equation 26

$$f(n) = \begin{cases} n^{\frac{1}{3}}, & n > 0.008856 \\ 7.787n + 0.137931, & \text{otherwise} \end{cases} \quad \text{equation 26}$$

The average value of color difference of the white light images before correction is 11.6 and the average value of color difference after correction is 2.84. As to the narrow band images, the average value before correction and the average value after correction are 29.14 and 2.58 respectively.

The host 10 runs the step S134, getting the image conversion model MODEL according to the correction space value, the white-light reflection spectrum, and the narrow-band reflection spectrum. Refer to equation 27, a transform matrix M is found out by the corrected space value [XYZ$_{Correct}$] obtained after correction of the endoscope, and white-light reflection spectrum and the narrow-band reflection spectrum measured by the spectrometer. Then the input image IMG is converted into the hyperspectral input image HSIMG by the transform matrix M of hyperspectral images.

$$[M] = [\text{Score}] \times pinv([V_{Color}]) \quad \text{equation 27}$$

$$[S_{Spectrum}]_{380-780} = [EV][M][V_{Color}] \quad \text{equation 3}$$

wherein [Score] is a plurality sets of principal component (EV) obtained by principal component regression of the reflection spectrum data [R$_{Spectrum}$]. In the first embodiment, 10 sets of principal components with higher explanation (total weight percentage over 99.99%) are used to perform dimensionality reduction and a simulated spectrum [S$_{Spectrum}$] 380-780 is obtained by the equation 3. An error between the simulated spectrum [S$_{Spectrum}$] 380-780 and the [XYZ$_{Spectrum}$] which corresponds to the input image IMG of the white light image is corrected from 11.60 to 2.85 while an error between the simulated spectrum [S$_{Spectrum}$] 380-780 and the [XYZ$_{Spectrum}$] which corresponds to the narrow band image is corrected from 29.14 to 2.60. Thereby color error is hardly recognized by human eyes. Thus better color reproduction performance is provided when users need color reproduction. Thereby the better hyperspectral input image HSIMG within visible wavelengths are simulated from the input images IMG.

According to the correction space value, the white-light reflection spectrum, and the narrow-band reflection spectrum, the image conversion model MODEL, equations 1-11, is obtained.

Refer to FIG. 1C, a flow chart showing steps of obtaining the reference narrow-band image information REF in the first embodiment is provided. The step S14 further includes the following step.

The host 10 executes the step S142: obtaining the reference narrow-band image information REF of a plurality of reference narrow-band images REFIMG according to the plurality of reference narrow-band images REFIMG. Preprocessing the plurality of reference narrow-band images REFIMG stored in the database 30, then inputting the plurality of reference narrow-band images REFIMG into the convolutional neural network 126, and using a convolution kernel C to extract features of the plurality of reference narrow-band images REFIMG as the reference narrow-band image information REF.

In order to maximize the effectiveness, the plurality of reference narrow-band images REFIMG is preprocessed. Then perform data cleaning of the collected plurality of reference narrow-band images REFIMG to remove blurred and defocused images. Then crop the images, cutting away unnecessary noises, black border, and patient information and only image block with esophageal is left. Lastly resize the images into a size of 380×380 pixels uniformly.

After data cleaning, place the plurality of reference narrow-band images REFIMG into the convolutional neural network 126, use a convolution kernel C to detect features of the plurality of reference narrow-band images REFIM, and extract features related to esophageal cancer as the reference narrow-band image information REF.

In the first embodiment of the present invention, the image conversion model MODEL can effectively get the simulated narrow-band image SIMG come from the input image IMG. Then the simulated narrow-band image information SD and the reference narrow-band image information REF of the simulated narrow-band image SIMG are compared according to an objective similarity index IND to generate an index data RESULT for determining similarity between the simulated narrow-band image information SD and the reference narrow-band image information REF.

Thus it is confirmed that the simulated narrow-band image SIMG can be applied as the narrow-band endoscopic image used to replace the white-light endoscopic image. Thereby the problems of conventional white-light endoscopic images such as unable to present difference between early-stage lesions and patient's normal tissue or difficult recognition of early-stage lesions can be solved. The physicians can easily discriminate difference along blood vessels, lesions, and background region by using a narrow-band endoscope for diagnosis of esophageal cancer. Yet direct use of the narrow-band endoscope for image capture can be replaced by the simulated narrow-band images originated from the white-light endoscopic image. The physicians can interpret the images more accurately while there is no need to increase the volume of the endoscope for mounting the optical filters and patients will not feel discomfort during endoscopy.

Moreover, the present invention can be applied to capsule endoscopes to overcome the problem of conventional capsule endoscopes. The capsule endoscope has quite small volume so that an optical filter is unable to be mounted therein once an image capture device and wireless transmission equipment are disposed therein. Thus the capsule endoscope is unable to capture narrow-band images. After receiving the white-light images captured by the capsule endoscope, narrow-band images are simulated from the white-light images by doctors for effective diagnosis of lesions.

Furthermore, a second embodiment is provided. Please refer to FIG. 1A, a flow chart showing steps of a method for narrow-band image generation according to the present invention is provided. As shown in the figure, the present method for narrow-band image generation includes the following steps executed by a host 10.

Step S10: obtaining an input image IMG of an object O by an image capture unit 20;

Step S12: converting the input image IMG according to an image conversion model MODEL and at least one target wave band BAND corresponding to a narrow-band light source to get a simulated narrow-band image SIMG; and Step S14: comparing a simulated narrow-band image information SD of the simulated narrow-band image SIMG with a reference narrow-band image information REF according to at least one objective similarity index IND to generate an index data RESULT for determining similarity between the simulated narrow-band image information SD and the reference narrow-band image information REF.

The image conversion model MODEL is a CycleGAN model.

Refer to FIG. 1C, a flow chart showing steps of obtaining the reference narrow-band image information REF in the first embodiment is provided. The present method further includes the following step before the step S14.

Step S142: getting the reference narrow-band image information REF of a plurality of reference narrow-band images according to the plurality of the reference narrow-band images.

Figure 3A:
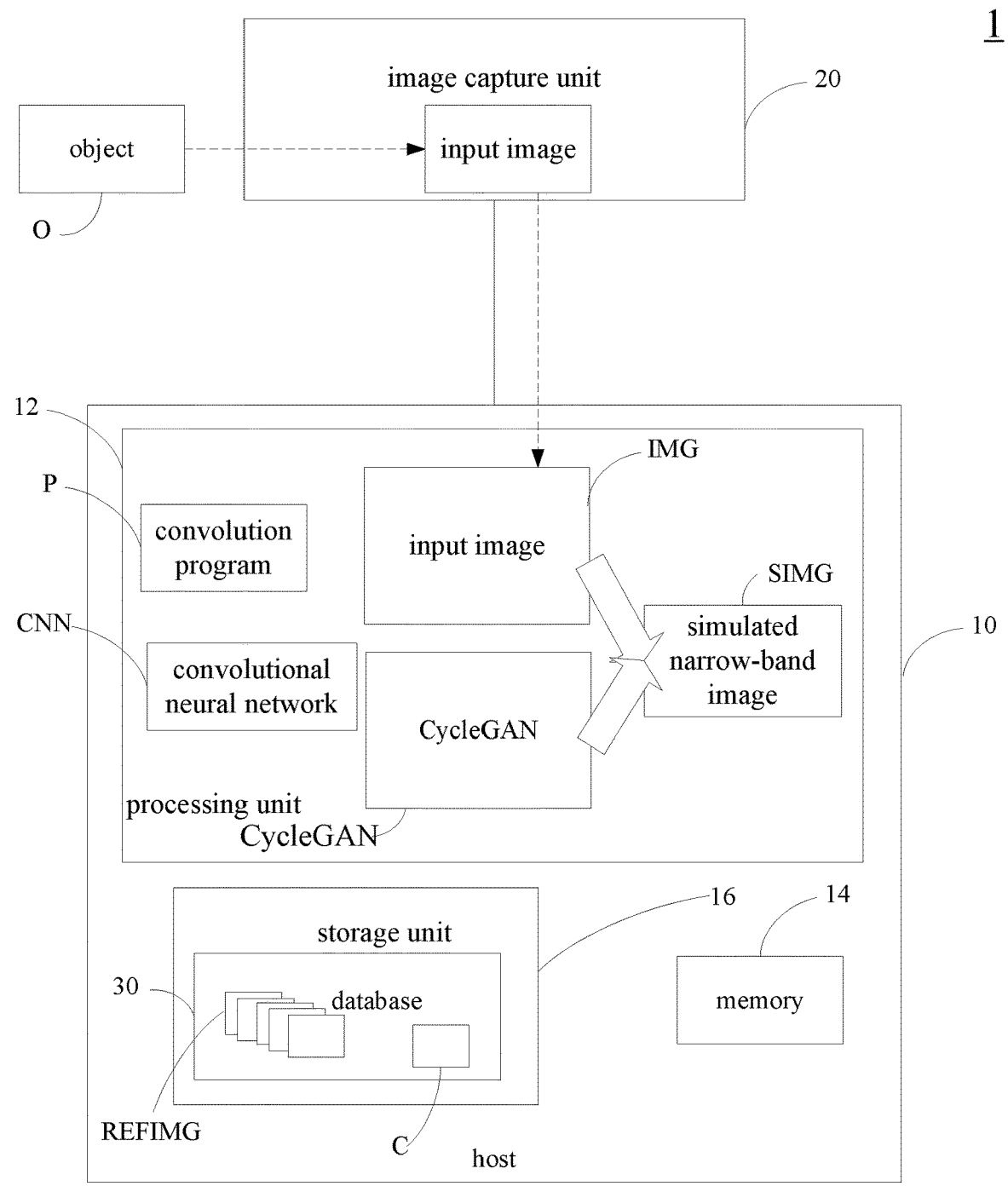
FIG. 3A-3B are block diagrams showing a part of steps of the second embodiment according to the present invention.
Figure 3B:
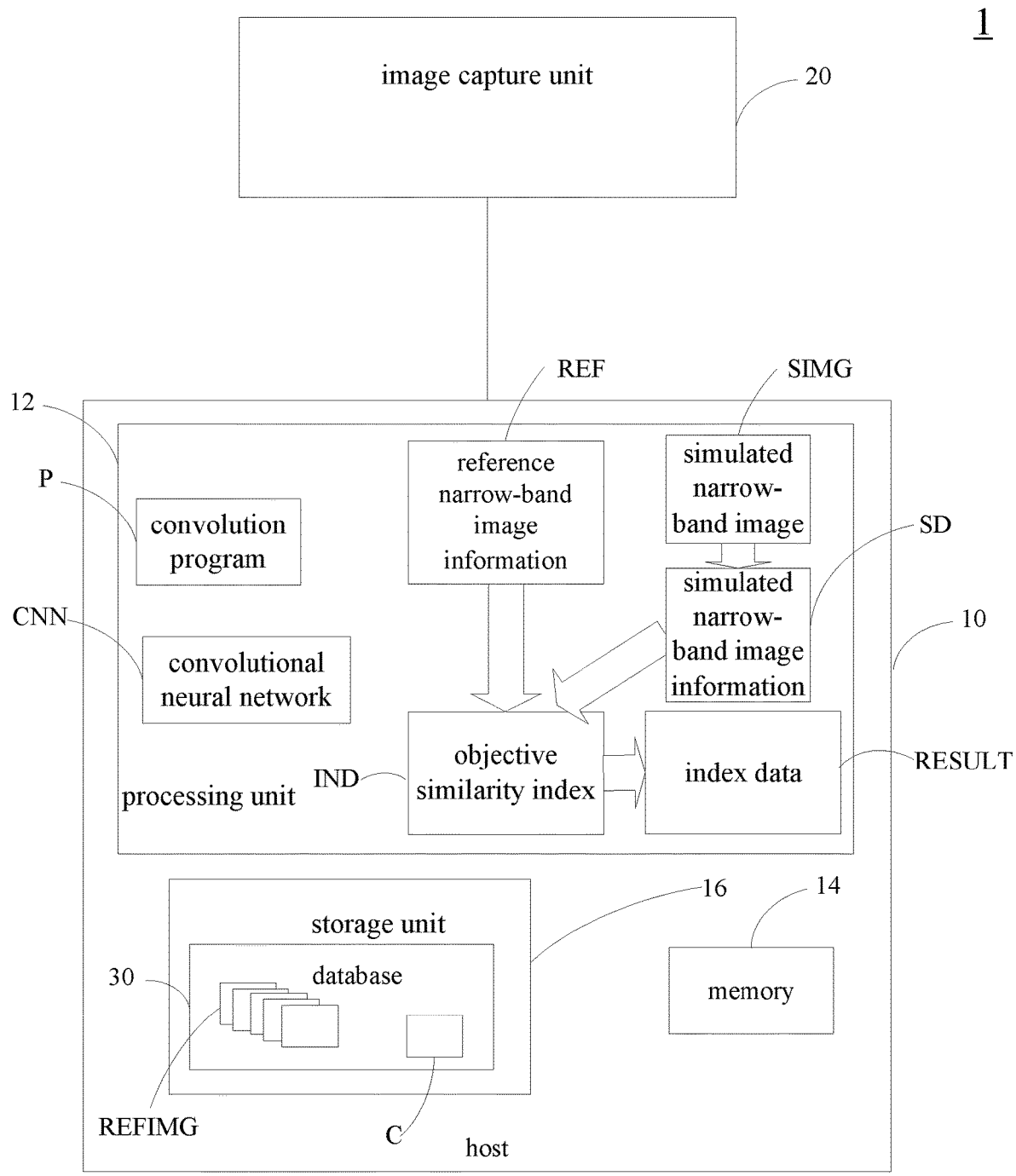

Refer to FIG. 3A and FIG. 3B, a block diagram showing a part of steps of the present method is provided. As shown in figures, the second embodiment of the present narrow-band image generation method for checking objects is used in combination with a detection system 1 which includes a host 10 and an image capture unit 20. In this embodiment, the host 10 is, but not limited to, a computer composed of a processing unit 12, a memory 14 and a storage unit 16. The host 10 can also be servers, desktops, tablets, or electronics device with computing capabilities. A database 30 is built in the storage unit 16, but not limited, it can also be an external storage device of the host 10. In the host 10, a convolution program P is run by the processing unit 12 and a convolutional neural network (CNN) 126 is set up correspondingly. Moreover, the image capture unit 20 in this embodiment is an endoscope used to look deep into organs and tissues inside the body including cystoscope, gastroscope, colonoscope, bronchoscope, laparoscope, etc.

Refer to FIG. 3A which is a block diagram showing a part of steps of the present method, the host 10 executes the step S12. In the second embodiment, obtaining an input image IMG of an object O by the image capture unit 20. The image capture unit 20 captures images and preform pre-treatment for removal of noises and uniform scaling of the images into a size of 380×380 pixels. Thus the input image IMG which is a white light image is obtained. The image capture unit 20 of the second embodiment is a white light endoscope (OLYMPUS EVIS LUCERA CV-260 SL) which gets the corresponding input image IMG.

Refer to FIG. 3A which is a block diagram showing a part of steps of the present method, the host 10 executes the step S12. In the second embodiment, converting the input image IMG according to an image conversion model MODEL and at least one target band BAND corresponding to a narrow-band light source to get a simulated narrow-band image SIMG. The image conversion model MODEL is a CycleGAN model. Use the CycleGAN model to covert the input image IMG into the simulated narrow-band image SIMG which corresponds to at least one target band BAND. The detailed conversion process is as the following.

Figure 4A:
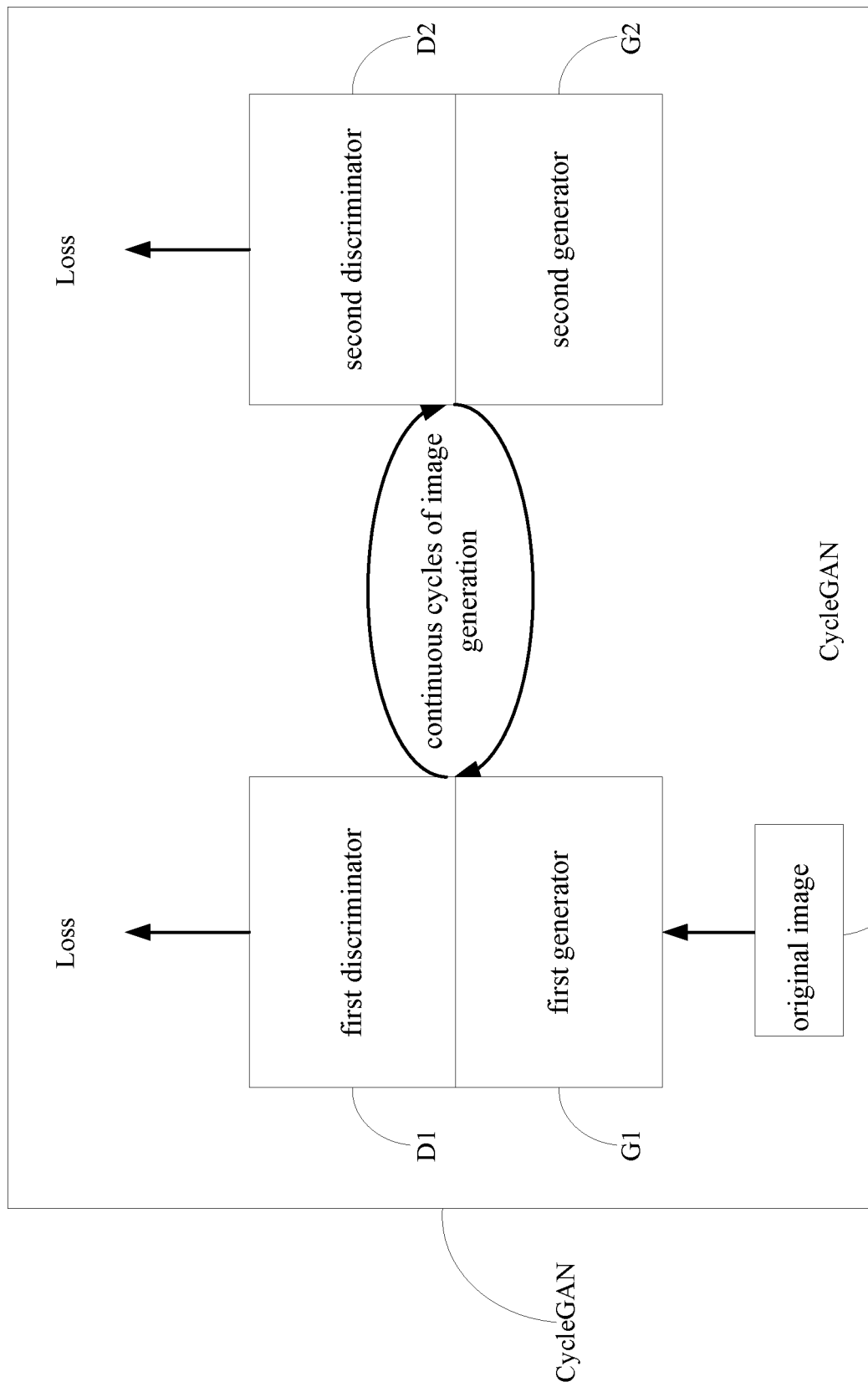
FIG. 4A-4B are block diagrams showing a CycleGAN model the second embodiment according to the present invention.
Figure 4B:
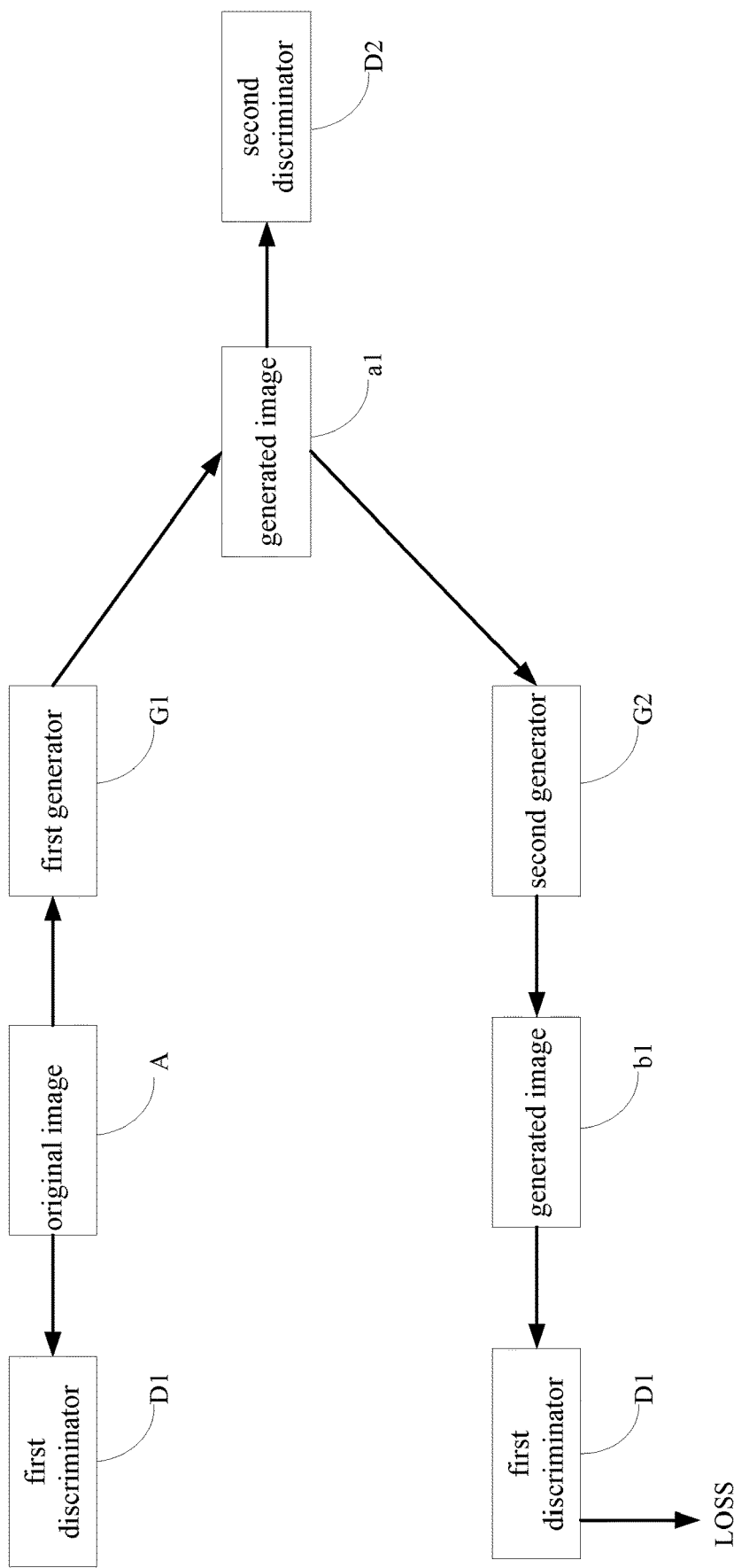

Refer to FIG. 4A and FIG. 4B, a block diagram of the image conversion model CycleGAN in the second embodiment of the present invention is provided. As shown in the figures, the CycleGAN model is composed of a first generator G1, a second generator G2, a first discriminator D1, and a second discriminator D2. An operating model of CycleGAN is described as below. According to an original image A being input, the first generator G1 creates a generated image a1 having a part of features of the original image A and sends the generated image a1 to the second generator G2. Then according to a part of the features of the generated image a1, the second generator G2 generates a generated image b1 having a part of the features of the generated image a1 and sends the generated image b1 to the first discriminator D1 which determines the features of the generated image b1 being input similar to those of the original image A and also removes noise LOSS of the generated image b1. Then the first generator G1 creates a generated image a2 and sends the generated image a2 to the second discriminator D2 which determines the features of the generated image a2 being input similar to the those of the original image a1 and also removes noise LOSS of the generated image a2. After continuous cycles of image generation and determination until the noise LOSS is lower than expected error of the CycleGAN model being set, consistency between the converted image and the original image can be ensured.

Algorithm-type image conversion model generally needs a large amount of pairwise data which means there is explicit association between at least two data elements. However, CycleGAN algorithm not only enables the task of image-to-image translation without the need for pairwise data, but also performs blurring techniques, color transfer, resolution enhancement, fill-in blank space, etc. During operation, loss function is a total of adversarial loss, cycle consistency loss, and identity loss and equation 28 is used to calculate data.

$$L(G, F, D_X, D_Y) = L_{GAN}(G, D_Y, X, Y) + \\ L_{GAN}(F, D_x, Y, X) + \lambda_{cycle} L_{consitency}(G, F) + \lambda_{id} L_{identity}(G, F)$$

equation 28

The batch size is set as 1 and training times is 150 while initial learning rate is set as 0.0002 and decreased along with increasing training times. Perform training until convergence of the Loss value.

The input image IMG is converted into the simulated narrow-mind image SIMG corresponding to at least one target band by the trained CycleGAN model.

Refer to FIG. 3B, the host 10 runs the step S14. In the second embodiment, compare a simulated image information SD of the simulated narrow-band image SIMG and a reference narrow-band image information REF according to at least one objective similarity index IND to generate an index data RESULT used for determining similarity between the simulated narrow-band image information SD and the reference narrow-band image information REF. First sRGB value of the simulated narrow-band image SIMG is converted into XYZ color space to get a XYZ color space value of the simulated narrow-band image SIMG which is the simulated narrow-band image information SD. Then compare similarity between the simulated narrow-band image information SD and the at least one reference narrow-band image information REF pre-stored in the database 30 according to the at least one objective similarity index IND pre-stored in the database 30 to generate an index data RESULT for determining the similarity between the simulated narrow-band image information SD and the reference narrow-band image information REF.

In the second embodiment, the objective similarity index IND used is a CIEDE2000 color-difference formula, an image entropy, or a structural similarity index (SSIM index).

CIEDE2000 is a color-difference formula recommended by the CIE (International Commission on Illumination) to predict visually perceived color difference. Based on a three-dimensional concept of a uniform color space, this formula calculates the color difference perceived by human, as the distance between two color points within a color space.

Lab value of Lab color space is used in the CIEDE2000 color-difference formula. Thus the RGB value of the simulated narrow-band image SIMG is converted to the XYZ color space by the equation 12 and then further converted to the Lab color space by the equation 11 to get the Lab value and obtain color difference between the simulated narrow-band image information SD and the reference narrow-band image information REF, as shown in the following table 4 and used as the index data RESULT $$\begin{bmatrix} X \\ Y \\ Z \end{bmatrix} = \begin{bmatrix} 0.4124564 & 0.3575761 & 0.1804375 \\ 0.2126729 & 0.7151522 & 0.0721750 \\ 0.0193339 & 0.1191920 & 0.9503041 \end{bmatrix} \begin{bmatrix} R \\ G \\ B \end{bmatrix}$$

equation 12

TABLE 4

CIEDE2000 color difference evaluation of simulated narrow-band images of the second embodiment:

| image | CIEDE2000 Min | CIEDE2000 Average | CIEDE2000 Max |
|---|---|---|---|
| white-light image | 2.07 | 8.24 | 14.91 |
| narrow-band image | 5.85 | 12.29 | 20.71 |

TABLE 4-continued

CIEDE2000 color difference evaluation of simulated narrow-band images of the second embodiment:

| image | CIEDE2000 Min | CIEDE2000 Average | CIEDE2000 Max |
|---|---|---|---|
| simulated narrow-band image of the second embodiment | 5.91 | 12.86 | 20.13 |

According to the color difference evaluation shown in table 4, it is learned that the color difference between white-light image and background is smaller compared with other images while the simulated narrow-band image in the second embodiment is highly similar to the narrow-band image in the color difference.

Entropy is first applied to thermodynamics and associated with the amount of chaos in a system, representing unavailability of the system's thermal energy for conversion into mechanical work. The greater the mass, the larger the entropy. While being used in the image, the entropy of the image represents how "busy" the image is. The greater the entropy of the image, the more information the image contains. Moreover, the entropy of the image in focus is larger than that of the image not in focus. The larger the entropy, the clearer the image. Yet that also means the image having higher chaos and uncertainty.

Based on the entropy of the image and free change of gray-scale of respective pixels in the image, an 8-bit image has a value of grayscale ranging from 0 to 255 and there are 256 different levels. First get a grayscale histogram and then calculate probability of the respective levels. At last, feature of the grayscale distribution is obtained by calculation of entropy using equation 13 and entropy values of the simulated narrow-band image information SD and the reference narrow-band image information REF are also obtained, as shown in the following table 5 and used as the index data RESULT.

$$H = -\sum\nolimits_{i=0}^{255} \log_2 Pi$$

equation 13

TABLE 5 comparison of entropy values of the simulated narrow-band images in the second embodiment

| image | Entropy Min | Entropy Average | Entropy Max |
|---|---|---|---|
| white-light image | 5.31 | 6.47 | 7.37 |
| narrow-band image | 5.11 | 6.15 | 7.19 |
| simulated narrow-band image in the second embodiment | 4.71 | 5.67 | 6.62 |

According to the entropy values of the images in Table 5, it is learned that the simulated narrow-band images in the second embodiment have lower chaos, less uncertainty, and difficulty in observation by eyes, but more advantages in AI assisted recognition compared with other images.

The SSIM is an index used for measuring the similarity between two images with the same size or detecting distortion of the images. The images are evaluated by comparison of luminance, contrast, and structure of the two images.

Calculation of the SSIM: first evaluate the luminance, the contrast, and the structure. In the luminance, perform average measurement using equation 14 through all image pixel values. xi is the pixel value of the i-th pixel of an image x while N is total number of the pixel values. As to the contrast, use equation 15 to take standard deviation (square root of the variance) of all pixel values for measurement. With respect to the structure, perform normalization of signals according to their own standard deviation so that the two signals being compared have unit standard deviation for measurement of structure, as shown in equation 16.

$$\mu_x = \frac{1}{N} \sum_{i=1}^{N} x_i \quad \text{equation 14}$$

$$\sigma_x = \left( \frac{1}{N-1} \sum_{i=1}^{N} (x_i - \mu_x)^2 \right)^{\frac{1}{2}} \quad \text{equation 15}$$

$$\sigma_{xy} = \frac{1}{N-1} \sum_{i=1}^{N} (x_i - \mu_x)(y_i - \mu_y) \quad \text{equation 16}$$

Lastly perform weighted calculation of the three elements—the luminance, the contrast, and the structure by equation 17 to get the SSIM of the simulated narrow-band image information SD and the reference narrow-band image information REF shown in the following table 6, used as the index data RESULT.

$$SSIM(x, y) = [l(x, y)]^\alpha \cdot [c(x, y)]^\beta \cdot [s(x, y)]^\gamma \quad \text{equation 17}$$

TABLE 6 similarity comparison of SSIM of the simulated narrow-band images in the second embodiment

| Image | SSIM Min | SSIM Average | SSIM Max |
|---|---|---|---|
| simulated narrow-band image & narrow-band image in the second embodiment | 0.57 | 0.64 | 0.76 |

According to the similarity comparison of SSIM in table 6, the simulated narrow-band images SIMG of the second embodiment and the narrow-band images are similar images after weighted calculation. Thereby the simulated narrow-band images SIMG can replace the narrow-band images during image recognition.

In the second embodiment of the present invention, the image conversion model MODEL can effectively get the simulated narrow-band image SIMG come from the input image IMG. Then the simulated narrow-band image information SD and the reference narrow-band image information REF of the simulated narrow-band image SIMG are compared according to an objective similarity index IND to generate an index data RESULT for determining similarity between the simulated narrow-band image information SD and the reference narrow-band image information REF. Thus it is confirmed that the white-light endoscopic image can be converted into the simulated narrow-band image SIMG by the CycleGAN model and the simulated narrow-band image SIMG can be used as the narrow-band endoscopic image. Compared with the first embodiment of the preset invention, the second embodiment doesn't have better performance on the objective similarity index IND but no preprocessing is required in the second embodiment. Moreover, the second embodiment can be applied to artificial intelligence, object-detection, image augmentation, etc.

In summary, a method for narrow-band image generation according to the present invention converts the input images into the simulated narrow-band images according to the image conversion model and the target wave band of the narrow-band light source by the host which executes computation. Lastly the simulated narrow-band images information with the reference narrow-band image information are compared according to the objective similarity index to generate the index data for determining similarity between the simulated narrow-band images and the reference narrow-band images.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method for narrow-band image generation run by a host comprising the steps of:
   obtaining at least one input image of an object by an image capture unit;
   getting an input white-light spectrum and a white-light reflection spectrum according to a white light source;
   obtaining an input narrow-band spectrum and a narrow-band reflection spectrum according to a narrow-band light source;
   obtaining a reflection spectrum space value from the white-light reflection spectrum and the narrow-band reflection spectrum according to a transformation function of reflection spectrum space;
   getting a light-source space value from the white-light spectrum and the narrow-band spectrum according to a spectral space transformation function;
   obtaining a correction matrix according to the reflection spectrum space value and the light-source space value;
   obtaining a correction space value from the reflection spectrum space value according to the correction matrix;
   getting an image conversion model according to the correction space value, the white-light reflection spectrum, and the narrow-band reflection spectrum;
   converting the input image according to the image conversion model and at least one target wave band corresponding to a narrow-band light source to get at least one simulated narrow-band image; and
   comparing a simulated narrow-band image information of the simulated narrow-band image with a reference narrow-band image information according to at least one objective similarity index to generate an index data used for determining similarity between the simulated narrow-band image information and the reference narrow-band image information;
   wherein the simulated narrow-band image is obtained by dimensionality reduction of a hyperspectral input image corresponding to the input image.

2. The method as claimed in claim 1, wherein the image capture unit is a white-light endoscope.

3. The method as claimed in claim 1, wherein the white light source is a white-light source for endoscopes.

4. The method as claimed in claim 3, wherein the white-light reflection spectrum is obtained by using the white-light source for endoscopes to capture single-color sRGB images (X-Rite ColorChecker Classic, 24 colors) and 24-color reflection spectrum data.

5. The method as claimed in claim 1, wherein the narrow-band light source is a narrow-band light source for endoscopes.

6. The method as claimed in claim 5, wherein the narrow-band reflection spectrum is obtained by using the narrow-band light source for endoscopes to capture single-color sRGB images (X-Rite ColorChecker Classic, 24 colors) and 24-color reflection spectrum data.

7. The method as claimed in claim 1, wherein the image conversion model is a CycleGAN model.

8. The method as claimed in claim 7, wherein the CycleGAN model converts the input image into the simulated narrow-band image corresponding to the target wave band through a convolutional neural network (CNN); wherein the CycleGAN model includes a first generator, a second generator, and two discriminators.

9. The method as claimed in claim 1, wherein the target wave band used during detection of esophageal cancer includes 415 nm blue light which is absorbed easily by hemoglobin, 540 nm green light easy to identify esophageal lesions, and red light at 600 nm band able to detect blood vessels in the deepest layer.

10. A method for narrow-band image generation run by a host, comprising:
    obtaining at least one input image of an object by an image capture unit;
    converting the input image according to an image conversion model and at least one target wave band corresponding to a narrow-band light source to get at least one simulated narrow-band image; and
    comparing a simulated narrow-band image information of the simulated narrow-band image with a reference narrow-band image information according to at least one objective similarity index to generate an index data used for determining similarity between the simulated narrow-band image information and the reference narrow-band image information;
    wherein the simulated narrow-band image is obtained by dimensionality reduction of a hyperspectral input image corresponding to the input image, and the objective similarity index IND is selected from the group consisting of a CIEDE2000 color-difference formula, an image entropy, and a structural similarity (SSIM) index.

11. The method as claimed in claim 10, wherein the CIEDE2000 is a color-difference formula for calculating perceived color difference between the simulated narrow-band image information and the reference narrow-band image information based on a uniform color space.

12. The method as claimed in claim 10, wherein the image entropy uses comparison of chaos in images to evaluate advantages of the simulated narrow-band image information and the reference narrow-band image information in image recognition.

13. The method as claimed in claim 10, wherein the SSIM index uses weighted calculation of luminance, contrast, and structure to evaluate advantages of the simulated narrow-band image information and the reference narrow-band image information in image recognition.

14. A method for narrow-band image generation run by a host, comprising:
    obtaining at least one input image of an object by an image capture unit;
    converting the input image according to an image conversion model and at least one target wave band corresponding to a narrow-band light source to get at least one simulated narrow-band image;
    obtaining the reference narrow-band image information of a plurality of reference narrow-band images according to the plurality of the reference narrow-band images; and
    comparing a simulated narrow-band image information of the simulated narrow-band image with a reference narrow-band image information according to at least one objective similarity index to generate an index data used for determining similarity between the simulated narrow-band image information and the reference narrow-band image information;
    wherein the simulated narrow-band image is obtained by dimensionality reduction of a hyperspectral input image corresponding to the input image.

15. The method as claimed in claim 14, wherein the plurality of the reference narrow-band images is a plurality of narrow-band endoscopic images.

* * * * *